US011831158B2

United States Patent
Du et al.

(10) Patent No.: US 11,831,158 B2
(45) Date of Patent: Nov. 28, 2023

(54) POWER GRID FAULT DETECTION METHOD AND DEVICE WITH DISTRIBUTED ENERGY RESOURCE

(71) Applicant: Siemens Aktiengesellschaft, Munich (DE)

(72) Inventors: Feng Du, Shanghai (CN); Wei Gang Chen, Shanghai (CN); Zhen Liu, Shanghai (CN); Yue Zhuo, Beijing (CN)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 196 days.

(21) Appl. No.: 16/965,383

(22) PCT Filed: Jan. 31, 2018

(86) PCT No.: PCT/CN2018/074814
§ 371 (c)(1),
(2) Date: Jul. 28, 2020

(87) PCT Pub. No.: WO2019/148391
PCT Pub. Date: Aug. 8, 2019

(65) Prior Publication Data
US 2021/0159696 A1  May 27, 2021

(51) Int. Cl.
*H02J 3/00* (2006.01)
*H02J 13/00* (2006.01)
(Continued)

(52) U.S. Cl.
CPC ........ *H02J 3/0012* (2020.01); *G05B 23/0221* (2013.01); *H02J 3/381* (2013.01); *H02J 13/00002* (2020.01); *H02J 2300/24* (2020.01)

(58) Field of Classification Search
CPC .... H02J 3/0012; H02J 3/381; H02J 13/00002; H02J 2300/24; H02J 3/001; G05B 23/0221; Y02E 10/56
(Continued)

(56) References Cited

U.S. PATENT DOCUMENTS 10,276,321 B2 *  4/2019  Kennedy .................. H01H 9/54
10,424,910 B2    9/2019  Platise
(Continued)

FOREIGN PATENT DOCUMENTS

CN    101562333 A    10/2009
CN    101789596 A    7/2010
(Continued)

OTHER PUBLICATIONS

Firouz et al., "Numerical comparison of the effects of different types of distributed generation units on overcurrent protection systems in MV distribution grids", 2014, pp. 271-283 downloaded from https://www.sciencedirect.com/science/article/pii/S0960148114001839 (Year: 2014).*
(Continued)

*Primary Examiner* — Christopher E. Everett
*Assistant Examiner* — Olvin Lopez Alvarez
(74) *Attorney, Agent, or Firm* — Harness, Dickey & Pierce, P.L.C.

(57) ABSTRACT

Provided are a grid fault detection method and a device. The grid includes at least one AC power source provided by a public grid. The AC power source is coupled to a plurality of parallel circuits, each including a plurality of parallel branches. The parallel branches are each connected with a load and/or a DC power source. The grid fault detection method having the distributed energy resource includes: selecting a first collection point between the AC power source and the plurality of parallel circuits, and collecting a
(Continued)

current value and a current direction of the first collection point; comparing an output current and an input current of the first collection point, and upon the input current being greater than the output current, it is determined that the plurality of parallel circuits are faulty. Accordingly, the plurality of collection points check the fault, so as to trigger a protection device.

20 Claims, 4 Drawing Sheets

(51) Int. Cl.
    *H02J 3/38*       (2006.01)
    *G05B 23/02*     (2006.01)

(58) Field of Classification Search
    USPC .......................................................... 700/287
    See application file for complete search history.

(56) References Cited

U.S. PATENT DOCUMENTS

| | | | |
|---|---|---|---|
| 2012/0049627 A1 | 3/2012 | Matsuo et al. | |
| 2013/0107407 A1* | 5/2013 | Pan | H02H 3/305 361/87 |
| 2013/0138366 A1* | 5/2013 | Yan | H02H 7/261 702/58 |
| 2013/0265680 A1 | 10/2013 | Smit et al. | |
| 2014/0032144 A1* | 1/2014 | Kussyk | H02J 13/00034 702/64 |
| 2014/0049115 A1 | 2/2014 | Adest et al. | |
| 2014/0063669 A1* | 3/2014 | Lundqvist | H02H 3/30 361/79 |
| 2017/0054291 A1 | 2/2017 | Qi et al. | |
| 2018/0233902 A1 | 8/2018 | Sano et al. | |

FOREIGN PATENT DOCUMENTS

| | | |
|---|---|---|
| CN | 102682980 A | 9/2012 |
| CN | 102818972 A | 12/2012 |
| CN | 103245873 A | 8/2013 |
| CN | 104360228 A | 2/2015 |
| CN | 104459465 A | 3/2015 |
| CN | 104635115 A | 5/2015 |
| CN | 105870893 A | 8/2016 |
| CN | 105914776 A | 8/2016 |
| DE | 102014004912 A1 | 10/2015 |
| DE | 102016110188 A1 | 12/2017 |
| JP | H06225448 A | 8/1994 |
| JP | H09200946 * 7/1997 ............... H02H 3/28 |
| WO | WO 2017175535 A1 | 10/2017 |

OTHER PUBLICATIONS

Zhao et al., "Evaluation Method for Impact on Protection of Distribution Network with Distributed Electric Resources", 2014, pp. 824-829 downloaded from https://ieeexplore.ieee.org/document/6991824 (Year: 2014).*

Coster et al., " Effect of Distributed Generation on Protection of Medium Voltage Cable Grids", 2007 pp. 1-4, downloaded from https://www.researchgate.net/publication/228901553_Effect_of_distributed_generation_on_protection_of_medium_voltage_cable_grids (Year: 2007).*

Mauryia et al., "Quadrature based over-current relay for PV penetrated primary distribution system" 2020, pp. 6, downloaded from https://ieeexplore.ieee.org/document/9331893 (Year: 2020).*

Brearley et al., "A review on issues and approaches for microgrid protection", 2017 pp. 988-997 downloaded from https://www.sciencedirect.com/science/article/pii/S1364032116305354 (Year: 2017).*

Shahzad et al., "Protection of Distributed Generation: Challenges and Solutions", 2017, pp. 40 downloaded from https://www.researchgate.net/publication/319936973_Protection_of_Distributed_Generation_Challenges_and_Solutions (Year: 2017).*

International Search Report PCT/ISA/210 for International Application No. PCT/CN2018/074814 dated Oct. 23, 2018.

Written Opinion of the International Searching Authority for International Application No. PCT/CN2018/074814 dated Oct. 23, 2018.

* cited by examiner

POWER GRID FAULT DETECTION METHOD AND DEVICE WITH DISTRIBUTED ENERGY RESOURCE

PRIORITY STATEMENT

This application is the national phase under 35 U.S.C. § 371 of PCT International Application No. PCT/CN2018/074814 which has an International filing date of Jan. 31, 2018, which designated the United States of America, the entire contents of which are hereby incorporated by reference herein, in their entirety and for all purposes.

FIELD

Embodiments of present invention generally relate to a grid, in particular to a method and device for detecting a fault in a grid having distributed energy sources.

BACKGROUND ART

In a conventional power system having no distributed power sources, all of the loads rely on a public grid to provide an AC power source power supply. In such a power system, a fault current can only come from the AC power source, so it is possible to determine whether a fault has occurred in the grid simply by determining whether multiple protection devices in the grid have exceeded a fault current threshold. A protection device in the grid can be triggered if it exceeds the fault current threshold, opening the circuit and cutting off the power supply of the public grid AC power source, in order to prevent an accident.

Figure 1:
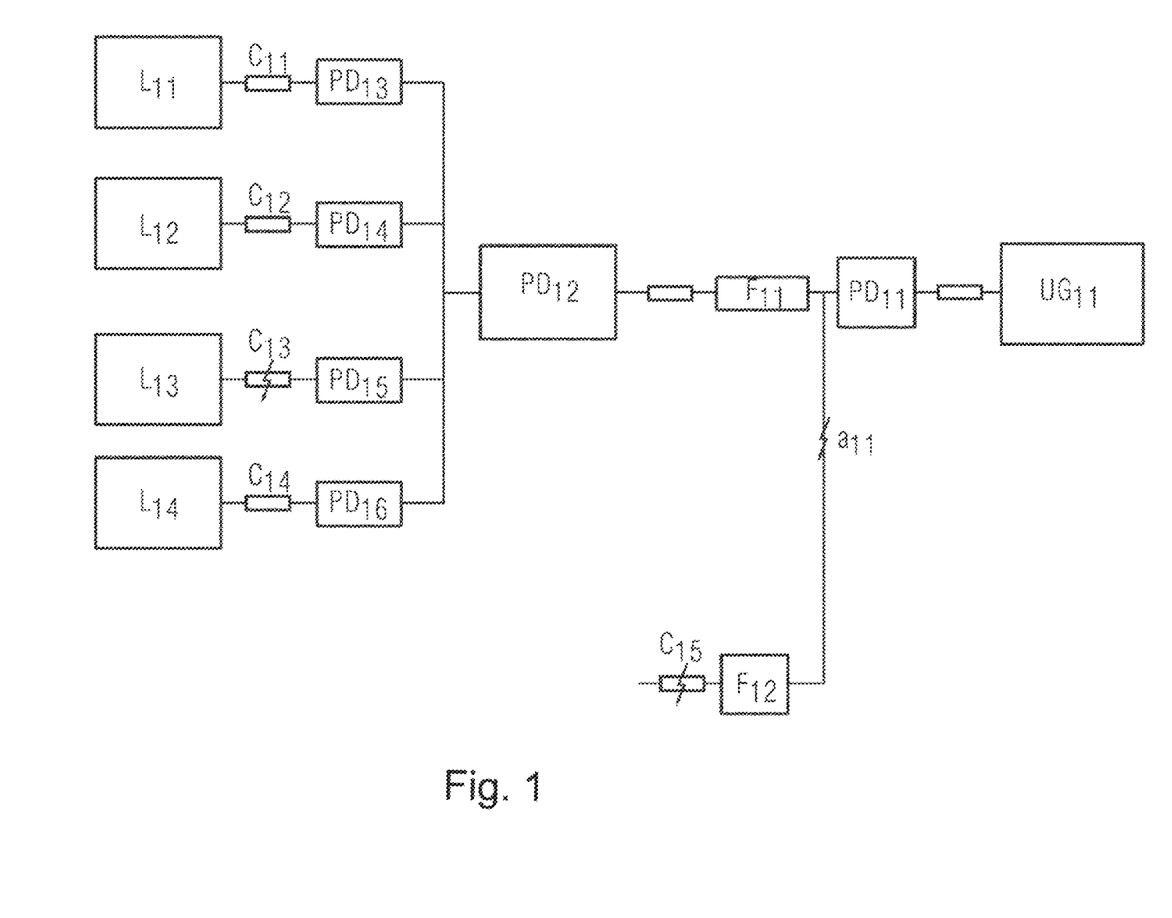
FIG. 1 is a line connection diagram of a power system having no distributed power sources in the prior art.

FIG. 1 is a power system having no distributed power sources in the prior art. As shown in FIG. 1, the public grid provides an AC power source $UG_{11}$; the AC power source $UG_{11}$ is sequentially connected to a protection device $PD_{11}$, a fuse device $F_{11}$ and a protection device $PD_{12}$; the protection device $PD_{12}$ is connected to a parallel circuit. The parallel circuit comprises multiple branches, wherein one branch is formed by a protection device $PD_{13}$, a cable $C_{11}$ and a load $L_{11}$ connected in series, another branch is formed by a protection device $PD_{14}$, a cable $C_{12}$ and a load $L_{12}$ connected in series, another branch is formed by a protection device $PD_{15}$, a cable $C_{13}$ and a load Ln connected in series, and another branch is formed by a protection device $PD_{16}$, a cable $C_{14}$ and a load Ln connected in series. A series branch is also connected between protection device $PD_{11}$ and fuse device $F_{11}$, the series branch being sequentially connected to a fuse device $F_{12}$ and a cable $C_{15}$.

Thus, when a fault occurs at fault point $a_{11}$, protection device P11 should be triggered first. When a fault occurs in cable $C_{14}$, protection device $PD_{15}$ should be triggered first. When a fault occurs in cable $C_{15}$, fuse device $F_{12}$ is triggered first.

A fault current threshold is preset for each of the protection devices, and a protection device can only be triggered to protect the entire line when a fault current flowing through the protection device exceeds the fault current threshold. However, in a power system having distributed power sources, since the AC power source power supply that is provided by the public grid is not the only power source, other DC power sources such as solar power sources are also often disposed at user-end loads. Thus, other branches in the line of the entire power system will also split the flow of a fault current, and consequently, a fault current flowing through a protection device is unable to reach the fault current threshold, and so the protection device cannot be triggered, and cannot protect the circuit of the power system.

SUMMARY

A first embodiment of the present invention provides a method for detecting a fault in a grid having distributed energy sources, the grid comprising at least one AC power source provided by a public grid, the AC power source being coupled to multiple parallel circuits connected in parallel, each of the parallel circuits comprising multiple parallel branches, the parallel branches being respectively connected to a load and/or DC power source, wherein the method for detecting a fault in a grid having distributed energy sources comprises the following steps: choosing a first collection point between the AC power source and the multiple parallel circuits connected in parallel, and collecting a current value of the first collection point and a current direction thereof;

comparing an output current and an input current of the first collection point, and if the input current thereof is greater than the output current, determining that a fault has occurred in the multiple parallel circuits connected in parallel.

A second embodiment of the present invention provides a device for detecting a fault in a grid having distributed energy sources, the grid comprising an AC power source provided by at least one public grid, the AC power source being coupled to multiple parallel circuits connected in parallel, each of the parallel circuits comprising multiple parallel branches, the parallel branches being respectively connected to a load and/or DC power source, wherein the device for detecting a fault in a grid having distributed energy sources comprises: a first protection device, which is connected between the AC power source and the multiple parallel circuits connected in parallel, wherein a first collection point is further chosen between the AC power source and the multiple parallel circuits connected in parallel; the first protection device collects a current value of the first collection point and a current direction thereof, and compares an output current and an input current of the first collection point, and if the input current thereof is greater than the output current, determines that a fault has occurred in the multiple parallel circuits connected in parallel.

A third embodiment of the present invention further provides a device for detecting a fault in a grid having distributed energy sources, the grid comprising at least one AC power source provided by a public grid, the AC power source being coupled to multiple parallel circuits connected in parallel, each of the parallel circuits comprising multiple parallel branches, the parallel branches being respectively connected to a load and/or DC power source, wherein the device for detecting a fault in a grid having distributed energy sources comprises: a first protection device, which is connected between the AC power source and the multiple parallel circuits connected in parallel; a controller connected to the first protection device, wherein a first collection point is further chosen between the AC power source and the multiple parallel circuits connected in parallel; the first protection device collects a current value of the first collection point and a current direction thereof and transmits same to the controller; the controller compares an output current and an input current of the first collection point, and if the input current thereof is greater than the output current, determines that a fault has occurred in the multiple parallel circuits connected in parallel.

DETAILED DESCRIPTION OF THE EXAMPLE EMBODIMENTS

A first embodiment of the present invention provides a method for detecting a fault in a grid having distributed energy sources, the grid comprising at least one AC power source provided by a public grid, the AC power source being coupled to multiple parallel circuits connected in parallel, each of the parallel circuits comprising multiple parallel branches, the parallel branches being respectively connected to a load and/or DC power source, wherein the method for detecting a fault in a grid having distributed energy sources comprises the following steps: choosing a first collection point between the AC power source and the multiple parallel circuits connected in parallel, and collecting a current value of the first collection point and a current direction thereof;

comparing an output current and an input current of the first collection point, and if the input current thereof is greater than the output current, determining that a fault has occurred in the multiple parallel circuits connected in parallel.

Furthermore, in at least one embodiment, the input current of the first collection point is:

$$I_{in}=I_{PDgrid}+\Sigma I_{branchi},$$

wherein $I_{PDgrid}$ is a current outputted from the AC power source to the first collection point, and $\Sigma I_{branchi}$ is a current having the same direction as the $I_{PDgrid}$ and outputted to the first collection point from the multiple parallel circuits connected in parallel, i being a natural number.

Furthermore, in at least one embodiment, the output current of the first collection point is:

$$I_{out}=\Sigma I_{branchi},$$

wherein $\Sigma I_{branchi}$ is a current having the opposite direction to the $I_{PDgrid}$ and outputted to the first collection point from the multiple parallel circuits connected in parallel, i being a natural number.

Furthermore, in at least one embodiment, the following step is performed after comparison and determination: arranging multiple second collection points in a region of the multiple parallel circuits connected in parallel, collecting multiple current values of the multiple second collection points, and when the minimum value amongst the multiple current values of the multiple second collection points is greater than a first fault current threshold, determining that the fault is a blind spot fault.

Furthermore, in at least one embodiment, the following step is performed after collection and determination: when the current value of any one of the second collection points is greater than a second fault current threshold, triggering a second protection device of the parallel branch where the second collection point is located, wherein the second fault current threshold is less than the first fault current threshold.

A second embodiment of the present invention provides a device for detecting a fault in a grid having distributed energy sources, the grid comprising an AC power source provided by at least one public grid, the AC power source being coupled to multiple parallel circuits connected in parallel, each of the parallel circuits comprising multiple parallel branches, the parallel branches being respectively connected to a load and/or DC power source, wherein the device for detecting a fault in a grid having distributed energy sources comprises: a first protection device, which is connected between the AC power source and the multiple parallel circuits connected in parallel, wherein a first collection point is further chosen between the AC power source and the multiple parallel circuits connected in parallel; the first protection device collects a current value of the first collection point and a current direction thereof, and compares an output current and an input current of the first collection point, and if the input current thereof is greater than the output current, determines that a fault has occurred in the multiple parallel circuits connected in parallel.

Furthermore, in at least one embodiment, the device for detecting a fault in a grid having distributed energy sources further comprises multiple second protection devices connected to the branches of the multiple parallel circuits connected in parallel, wherein multiple second collection points are disposed in a region of the multiple parallel circuits connected in parallel; the second protection devices collect multiple current values of the multiple second collection points, and when the minimum value amongst the multiple current values of the multiple second collection points is greater than a first fault current threshold, the second protection devices determine that the fault is a blind spot fault.

Furthermore, in at least one embodiment, when the current value of any one of the second collection points is greater than a second fault current threshold, the second protection device is triggered, wherein the second fault current threshold is less than the first fault current threshold.

Furthermore, in at least one embodiment, the first protection device communicates with the multiple second protection devices respectively, and the multiple second protection devices communicate with each other.

Furthermore, in at least one embodiment, the device for detecting a fault in a grid having distributed energy sources further comprises multiple voltage/current detection modules connected to the branches of the multiple parallel circuits connected in parallel, wherein multiple second collection points are disposed in a region of the multiple parallel circuits connected in parallel; the second protection devices collect multiple current values of the multiple second collection points, and when the minimum value amongst the multiple current values of the multiple second collection points is greater than a first fault current threshold, the voltage/current detection modules determine that the fault is a blind spot fault, wherein a voltage/current detection module is also disposed in the first protection device.

Furthermore, in at least one embodiment, when the current value of any one of the second collection points is greater than a second fault current threshold, the voltage/current detection module triggers the second protection device of the parallel branch where the second collection point is located, wherein the second fault current threshold is less than the first fault current threshold.

Furthermore, in at least one embodiment, the first protection device communicates with the multiple voltage/current detection modules respectively.

A third embodiment of the present invention further provides a device for detecting a fault in a grid having distributed energy sources, the grid comprising at least one AC power source provided by a public grid, the AC power source being coupled to multiple parallel circuits connected in parallel, each of the parallel circuits comprising multiple parallel branches, the parallel branches being respectively connected to a load and/or DC power source, wherein the device for detecting a fault in a grid having distributed energy sources comprises: a first protection device, which is connected between the AC power source and the multiple parallel circuits connected in parallel; a controller connected to the first protection device, wherein a first collection point is further chosen between the AC power source and the multiple parallel circuits connected in parallel; the first protection device collects a current value of the first collection point and a current direction thereof and transmits same to the controller; the controller compares an output current and an input current of the first collection point, and if the input current thereof is greater than the output current, determines that a fault has occurred in the multiple parallel circuits connected in parallel.

Furthermore, in at least one embodiment, the device for detecting a fault in a grid having distributed energy sources further comprises multiple second protection devices connected to the branches of the multiple parallel circuits connected in parallel, wherein the controller is further connected to the second protection devices respectively, and multiple second collection points are disposed in a region of the multiple parallel circuits connected in parallel; the second protection devices collect multiple current values of the multiple second collection points and transmit same to the controller, and when the minimum value amongst the multiple current values of the multiple second collection points is greater than a first fault current threshold, the controller determines that the fault is a blind spot fault.

Furthermore, in at least one embodiment, when the current value of any one of the second collection points is greater than a second fault current threshold, the controller triggers the second protection device of the parallel branch where the second collection point is located, wherein the second fault current threshold is less than the first fault current threshold.

Furthermore, in at least one embodiment, the controller communicates with the first protection device and the multiple second protection devices respectively.

Embodiments of the present invention can arrange multiple collection points to troubleshoot faults according to line connections of the grid having distributed energy sources, and determine whether the fault is a blind spot fault so as to trigger a protection device, thereby avoiding misjudgment of blind spot faults.

Particular embodiments of the present invention are explained below in conjunction with the drawings.

Figure 2:
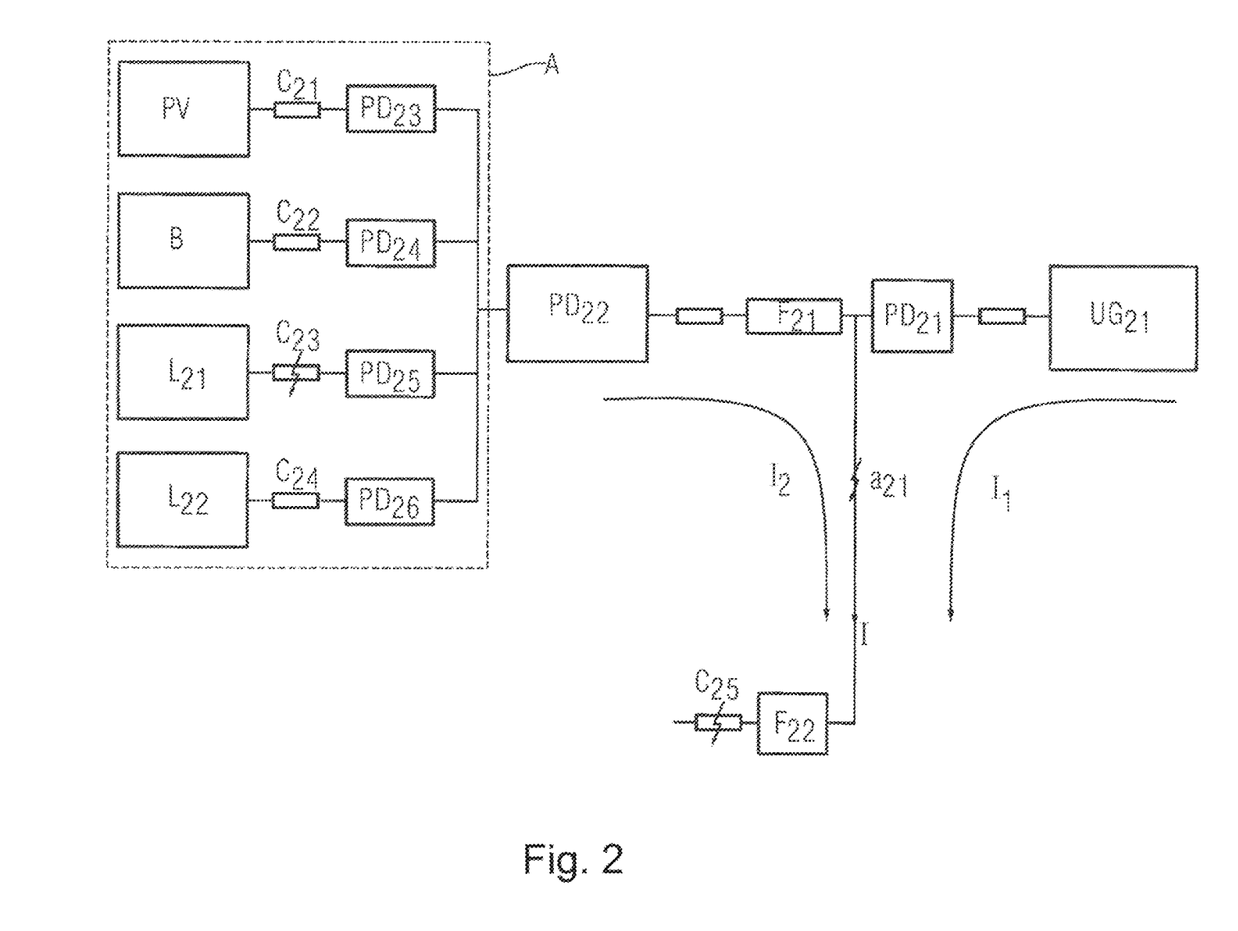
FIG. 2 is a line connection diagram of a power system having distributed power sources according to a specific embodiment of the present invention.

As FIG. 2 shows, in a power system having a distributed power source, in addition to comprising an AC power source power supply provided by the public grid, other DC power sources are also present. Suppose that the power system shown in FIG. 2 is a community power supply system, and an AC power source power supply 21 supplies AC electricity to four user ends of one unit. The AC power source $UG_{21}$ is sequentially connected to a protection device $PD_{21}$, a fuse device $F_{21}$ and a protection device $PD_{22}$; the protection device $PD_{22}$ is connected to a parallel circuit. The parallel circuit comprises four parallel branches, which come from four users of one unit respectively. A first parallel branch is formed by a protection device $PD_{23}$, a cable $C_{21}$ and a photovoltaic converter PV connected in series. A second parallel branch is formed by a protection device $PD_{24}$, a cable $C_{22}$ and a battery B connected in series. A third parallel branch is formed by a protection device $PD_{25}$, a cable $C_{23}$ and a first load $L_{21}$ connected in series. A fourth parallel branch is formed by a protection device $PD_{26}$, a cable $C_{24}$ and a second load $L_{22}$ connected in series. The photovoltaic converter PV and battery B are distributed power sources in the power system, and in particular are DC power sources. Thus, the module in region A in FIG. 2 is a nanogrid (distributed grid); a fault current thereof can come from the AC power source $UG_{21}$, but may also come from the photovoltaic converter PV and/or the battery B. A series branch is also present between the first fuse device $F_{21}$ and the first protection device $PD_{21}$; the series branch indicates that the community also comprises other units in addition to one unit of four user ends. The series branch is sequentially connected to a second fuse device $F_{22}$ and a fifth cable.

Thus, as shown in FIG. 2, when a fault occurs at fault an, the first protection device $PD_{21}$ and second protection device $PD_{22}$ should be triggered first. The second protection device $PD_{22}$ should be triggered before the third protection device $PD_{23}$ and fourth protection device $PD_{24}$, wherein the second protection device $PD_{22}$ is defined as an open circuit between the AC power source $UG_{21}$ and the nanogrid. At the same time, the first protection device $PD_{21}$ should not have a protection blind point in the entire line. When a fault occurs in cable $C_{23}$, the fifth protection device $PD_{25}$ should be triggered first. Similarly, when a fault occurs in the fifth cable $C_{25}$, fuse device $F_{22}$ should be triggered first.

However, when a fault occurs at $a_{21}$, a large fault current I will flow at fault point $a_{21}$. The fault current I comprises two parts: one part is supplied by the AC power source $UG_{21}$, and the other part is supplied by the photovoltaic converter PV and/or the battery B. The fault current supplied by the AC power source $UG_{21}$ is $I_1$ in an anticlockwise direction, and the fault current supplied by the photovoltaic converter PV and/or the battery B is $I_2$ in a clockwise direction, thus $I=I_1+I_2$. Suppose that the fault current threshold set for the first protection device $PD_{21}$ is 1000 A; then the first protection device $PD_{21}$ will be triggered and create an open circuit if the current flowing therethrough exceeds 1000 A. The fault current $I_2$ supplied by the photovoltaic converter PV and/or the battery B is 100 A, and suppose that at this time the fault current I is precisely 1000 A, thus the fault current flowing through the first protection device $PD_{21}$ is $I_1=I-I_2=800$ A. Since the fault current threshold set for the first protection device $PD_{21}$ is 1000 A, the first protection device $PD_{21}$ will not make a determination of a fault current and be triggered, thus a protection blind point in the entire line will arise.

Figure 3:
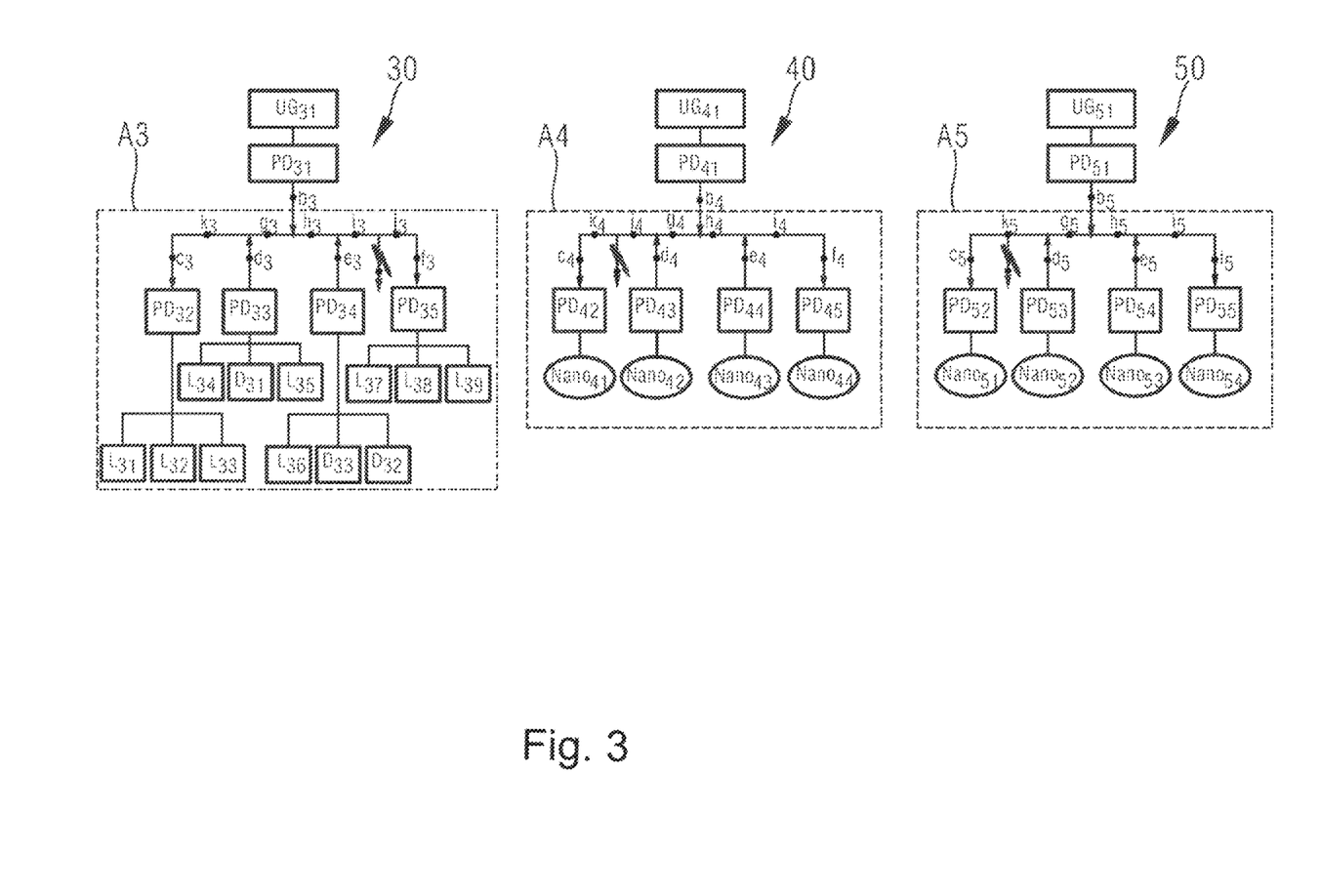
FIG. 3 is a line connection diagram of fault current detection in a power system having distributed power sources according to a specific embodiment of the present invention.

As shown in FIG. 3, an AC power source $UG_{31}$ provided by the public grid is disposed in a grid 300 having distributed power sources; the AC power source $UG_{31}$ is connected to a first protection device $PD_{31}$, the first protection device $PD_{31}$ being coupled to 4 parallel circuits connected in parallel, each parallel circuit comprising 3 parallel branches, wherein each parallel branch is connected to a load and/or a DC power source. Each parallel circuit represents a distributed grid (nanogrid), and distributed power sources may be disposed in the distributed grids. Specifically, a second protection device $PD_{32}$ is connected between a first parallel circuit and a first protection device $PD_{31}$, and the three parallel branches of the first parallel circuit are connected to a first load $L_{31}$, a second load $L_{32}$ and a third load $L_{33}$ respectively. A third protection device $PD_{33}$ is connected between a second parallel circuit and the first protection device $PD_{31}$, and the three parallel branches of the first parallel circuit are connected to a fourth load $L_{34}$, a first DC power source $D_{31}$ and a second DC power source $D_{32}$ respectively. A fourth protection device $PD_{34}$ is connected between a third parallel circuit and the first protection device $PD_{31}$, and the three parallel branches of the third parallel circuit are connected to a sixth load $L_{36}$, a third DC power source $D_{33}$ and a second DC power source $D_{32}$ respectively. A fifth protection device $PD_{35}$ is connected between a fourth parallel circuit and the first protection device $PD_{31}$, and the three parallel branches of the fourth parallel circuit are connected to a seventh load $L_{37}$, an eighth load $L_{38}$ and a ninth load $L_{39}$ respectively.

A first embodiment of the present invention provides a method for detecting a fault in a grid having distributed energy sources. The method comprises the following steps:

A step S1 is performed first: a first collection point is chosen between the AC power source and the multiple parallel circuits connected in parallel, and a current value of the first collection point and a current direction thereof are collected. According to a preferred embodiment of the present invention, a first collection point $b_3$ is chosen between the AC power source $UG_{31}$ and the multiple parallel circuits connected in parallel in the grid 300 having distributed power sources, i.e. the first collection point $b_3$ is disposed between the AC power source $UG_{31}$ provided by the public grid and the multiple parallel circuits before home entry. A current flowing through the first collection point $b_3$ comprises a current supplied from the AC power source $UG_{31}$, and currents supplied from distributed power sources of the branches formed by the four parallel circuits, wherein the direction of the current supplied by the AC power source $UG_{31}$ should be from the AC power source $UG_{31}$ toward the first collection point $b_3$, which is the downward direction shown in FIG. 3; this is an input current of the first collection point $b_3$. The currents supplied by the distributed power sources should be from one or more parallel circuits to the first collection point $b_3$, which is the upward direction shown in FIG. 3; this is an output current of the first collection point $b_3$. The input and output currents are in opposite directions. The present invention needs to collect the current values of the output current and the input current flowing through the first collection point $b_3$, and the current directions thereof. As shown in FIG. 3, since no distributed DC power sources are disposed in the first parallel circuit and fourth parallel circuit, the currents flowing through the second protection device $PD_{32}$ and fourth protection device $PD_{34}$ corresponding to the first parallel circuit and fourth parallel circuit respectively are both in a downward direction. Since the first DC power source $D_{31}$ is disposed in the second parallel circuit, and the second DC power source $D_{32}$ and third DC power source $D_{33}$ are disposed in the third parallel circuit, the currents flowing through the second protection device $PD_{32}$ and fourth protection device $PD_{34}$ corresponding to the second parallel circuit and third parallel circuit are in an upward direction.

A step S2 is then performed: the output current and input current of the first collection point are compared, and if the input current thereof is greater than the output current, it is determined that a fault has occurred in the multiple parallel circuits connected in parallel. The input current of the first collection point is:

$$I_{in}=I_{PDgrid}+\Sigma I_{branchi}(i=1,\ldots n),$$

wherein $I_{PDgrid}$ is the current outputted from the AC power source to the first collection point, and $\Sigma I_{branchi}$ is the current having the same direction as the $I_{PDgrid}$ and outputted to the first collection point from the multiple parallel circuits connected in parallel, i being a natural number. In general, the direction of the current $I_{PDgrid}$ outputted to the first collection point from the AC power source should be opposite to the direction of the current $I_{branchi}$ outputted to the first collection point from the multiple parallel circuits connected in parallel. However, when the direction of the current $I_{PDgrid}$ outputted to the first collection point from the AC power source should be the same as the direction of the current $I_{branchi}$ outputted to the first collection point from the multiple parallel circuits connected in parallel, the input current $I_{in}$ of the first collection point is the sum of the direction should of the current $I_{PDgrid}$ outputted to the first collection point from the AC power source and the current $I_{branchi}$ outputted to the first collection point from the multiple parallel circuits connected in parallel. Furthermore, the output current of the first collection point is:

$$I_{out}=\Sigma I_{branchi}(i=1,\ldots n)$$

wherein $\Sigma I_{branchi}$ is the current having the opposite direction to the $I_{PDgrid}$ and outputted to the first collection point from the multiple parallel circuits connected in parallel, i being a natural number. If $I_{input}>I_{output}$, this indicates that a fault has occurred in this region of the line.

In particular, this embodiment comprises four parallel circuits, which are connected to four customer ends respectively. The present invention also needs to collect the values and directions of the currents flowing through the four parallel circuits respectively, i.e. the values and directions of the currents flowing through a first collection point $c_3$, a first collection point $d_3$, a first collection point $e_3$ and a first collection point $f_3$ in the grid 300 having distributed power sources as shown in FIG. 3.

In particular, current acquisition is performed by the first protection device PD31 between the AC power source UG31 and the four parallel circuits. The blind point problem only arises when a system power source is higher than 80% of Un; this means that the fault current is always in a long-term protection region of the first protection device PD31. Thus, the requirements regarding line communication speed are not high.

For example, a second collection point $c_3$, a second collection point $d_3$, a second collection point $e_3$ and a second collection point $f_3$ are also disposed in the grid 30 having distributed power sources. The current outputted to the first collection point $b_3$ from the AC power source $UG_{31}$, the current flowing through the second collection point $c_3$ and the current flowing through the second collection point $f_3$ are all in a downward direction as shown, and are input currents. Thus, the input current of the first collection point $b_3$ is $I_{in30}=I_{PD31}+I_{c3}+I_{f3}$, wherein due to the fact that the first DC power source $D_{31}$ is disposed in a branch of the second parallel circuit, and the third DC power source $D_{33}$ and second DC power source $D_{32}$ are disposed in branches of the third parallel circuit respectively, the currents flowing through the second collection points $d_3$ and $e_3$ should both be in an upward direction, and are output currents. Thus, the output current of the first collection point $b_3$ is $I_{out30}=I_{d3}+I_{e3}$. When $I_{in3}>I_{out3}$, it is determined that a fault has occurred in a first region $A_3$ of the multiple parallel circuits connected in parallel.

For example, a second collection point $c_4$, a second collection point $d_4$, a second collection point $e_4$ and a second collection point $f_4$ are further disposed in a grid 40 having distributed power sources. An AC power source $UG_{41}$ is connected to a first protection device $PD_{41}$, and the first protection device $PD_{41}$ is connected to four parallel circuits connected in parallel, which are specifically a first parallel circuit $nano_{41}$, a second parallel circuit $nano_{42}$, a third parallel circuit $nano_{43}$ and a fourth parallel circuit $nano_{44}$. A second protection device $PD_{42}$ is connected between the second connection point $c_4$ and the first parallel circuit $nano_{41}$, a third protection device $PD_{43}$ is connected between the second connection point $d_4$ and the second parallel circuit $nano_{42}$, a fourth protection device $PD_{44}$ is connected between the second connection point $e_4$ and the third parallel circuit $nano_{43}$, and a fifth protection device $PD_{45}$ is connected between the second connection point $f_4$ and the fourth parallel circuit $nano_{44}$.

The current outputted to the first collection point $b_4$ from the AC power source $UG_{41}$, the current flowing through the second collection point $c_3$ and the current flowing through the second collection point $f_4$ are all in a downward direction as shown, and are input currents. Thus, the input current of the first collection point $b_4$ is $I_{in40}=I_{PD41}+I_{c4}+I_{f4}$. The currents flowing through the second collection points $d_4$ and $e_4$ should both be in an upward direction, and are output currents. Thus, the output current of the first collection point $b_4$ is $I_{out4}=I_{d4}+I_{c4}$. When $I_{in3}>I_{out3}$, it is determined that a fault has occurred in a first region $A_4$ of the multiple parallel circuits connected in parallel.

For example, a second collection point $c_5$, a second collection point $d_5$, a second collection point $e_5$ and a second collection point $f_5$ are further disposed in a grid 50 having distributed power sources. An AC power source $UG_{51}$ is connected to a first protection device $PD_{51}$, and the first protection device $PD_{51}$ is connected to four parallel circuits connected in parallel, which are specifically a first parallel circuit $nano_{51}$, a second parallel circuit $nano_{52}$, a third parallel circuit $nano_{53}$ and a fourth parallel circuit $nano_{54}$. A second protection device $PD_{42}$ is connected between the second connection point $c_5$ and the first parallel circuit $nano_{51}$, a third protection device $PD_{53}$ is connected between the second connection $point_{54}$ and the second parallel circuit $nano_{52}$, a fourth protection device $PD_{54}$ is connected between the second connection $point_{54}$ and the third parallel circuit $nano_{53}$, and a fifth protection device $PD_{55}$ is connected between the second connection point $f_4$ and the fourth parallel circuit $nano_{54}$.

The current outputted to the first collection point $b_5$ from the AC power source $UG_{51}$ and the current flowing through the second collection point $f_5$ are both in a downward direction as shown, and are input currents. Thus, the input current of the first collection point $b_5$ is $I_{in50}=I_{PD51}+I_{f5}$. The currents flowing through the second collection points $d_5$, $e_5$ and $c_5$ should all be in an upward direction, and are output currents. Thus, the output current of the first collection point $b_4$ is $I_{out5}=I_{c5}+I_{d5}+I_{c5}$. When $I_{in3}>I_{out3}$, it is determined that a fault has occurred in a first region $A_5$ of the multiple parallel circuits connected in parallel.

A step S3 is then performed: multiple second collection points are disposed in a region of the multiple parallel circuits connected in parallel, multiple current values of the multiple second collection points are collected, and when the minimum value amongst the multiple current values of the multiple second collection points is greater than a first fault current threshold, it is determined that the fault is a blind spot fault. The second fault current threshold is less than the first fault current threshold. Through step S2, we can only determine that a fault has occurred in a first region where one or more parallel circuits are located, but cannot locate the specific position of the specific fault, and cannot identify the specific type of the fault; in particular it is necessary to determine whether it is a blind point fault, and exclude the risk associated with a blind point fault. Since the branch connections of the parallel circuits are fixed, the present invention is able to determine all points in the parallel circuits where a fault might occur, and collect currents.

For example, points where a fault current might occur on parallel circuits of the grid 300 having distributed power sources include second collection point $c_3$, second collection point $d_3$, second collection point $e_3$, second collection point $f_3$, second collection point $g_3$, second collection point $h_3$, second collection point $i_3$, collection point $j_3$ and second collection point $k_3$. If the minimum values of the values of currents flowing through the abovementioned second collection points all exceed the first fault current threshold, then it can be determined that a blind point fault has occurred in the first region $A_3$. Typically, current acquisition at the abovementioned second collection points may be performed by a protection device.

Finally, a step S4 is performed: when the current value of any one of the second collection points is greater than a second fault current threshold, the protection device of the parallel branch where the second collection point in question is located is triggered, wherein the second fault current threshold is less than the first fault current threshold. When the protection devices of all of the parallel branches on which blind spot faults have occurred have been triggered and created open circuits, the flow of fault current is not split on the parallel branches, therefore the fault current can reach the first fault current threshold at the protection device close to the first collection point, resulting in triggering to completely solve the problem of blind spot faults on the line.

Specifically, in the grid 300 having distributed power sources, suppose that the maximum current value in the second collection point $c_3$, second collection point $d_3$, second collection point $e_3$, second collection point $f_3$, second collection point $g_3$, second collection point $h_3$, second collection point $i_3$, collection point $j_3$ and second collection point $k_3$ occurs at second collection point $i_3$; the maximum current value occurring at second collection point $i_3$:

$$I_{max}=I_{PD31}+I_{d3}+I_{e3}-I_{c3}.$$

Specifically, in the grid 400 having distributed power sources, suppose that the maximum current value in the second collection point $c_4$, second collection point $d_4$, second collection point $e_4$, second collection point $f_4$, second collection point $g_4$, second collection point $h_4$, second collection point $i_4$, collection point $j_4$ and second collection point $k_4$ occurs at second collection point $j_4$; the maximum current value occurring at second collection point $j_4$:

$$I_{max}=I_{PD41}+I_{nano42}+I_{nano43}-I_{nano44}.$$

Specifically, a second collection point $c_5$, second collection point $d_5$, second collection point $e_5$, second collection point $f_5$, second collection point $g_5$, second collection point $h_5$, second collection point $i_5$ and second collection point $k_5$ are disposed in the grid 500 having distributed power sources. Suppose that $I_{nano51}>I_{nano52}$, and the maximum current value in the abovementioned collection points occurs at second collection point $k_5$; then the maximum current value occurring at second collection point $k_5$ is:

$$I_{max}=I_{PD51}+I_{nano1}+I_{nano3}-I_{nano2}-I_{nano4};$$

Suppose that $I_{nano51}<I_{nano52}$, and the maximum current value in the abovementioned collection points occurs at second collection point $g_5$; then the maximum current value occurring at second collection point $g_5$ is:

$$I_{max}=I_{PD51}+_{nano3}-_{nano4}.$$

Thus, it is clear from the above analysis that the maximum value of current occurring in the multiple second collection points is determined jointly by the circuit connections and structure of the parallel circuits and the fault current.

Thus, from the perspective of the first protection devices $PD_{31}$, $PD_{41}$ and $PD_{51}$ close to the first collection points $b_3$, $b_4$ and $b_5$, a blind point fault will only occur when $I_{max}$ is greater than the first fault current threshold, $IPD_{31}$ or $IPD_{41}$ or $IPD_{51}$ is less than the first fault current threshold, and the first fault current threshold is a threshold of the first protection devices $PD_{31}$, $PD_{41}$ and $PD_{51}$.

From the perspective of the protection devices of the parallel circuits, a blind point fault will only occur when $I_{max}$ is greater than the second fault current threshold, and the second fault current threshold is less than the first fault current threshold, wherein the second fault current threshold is a threshold of a protection device of a branch having a distributed power source.

Figure 4:
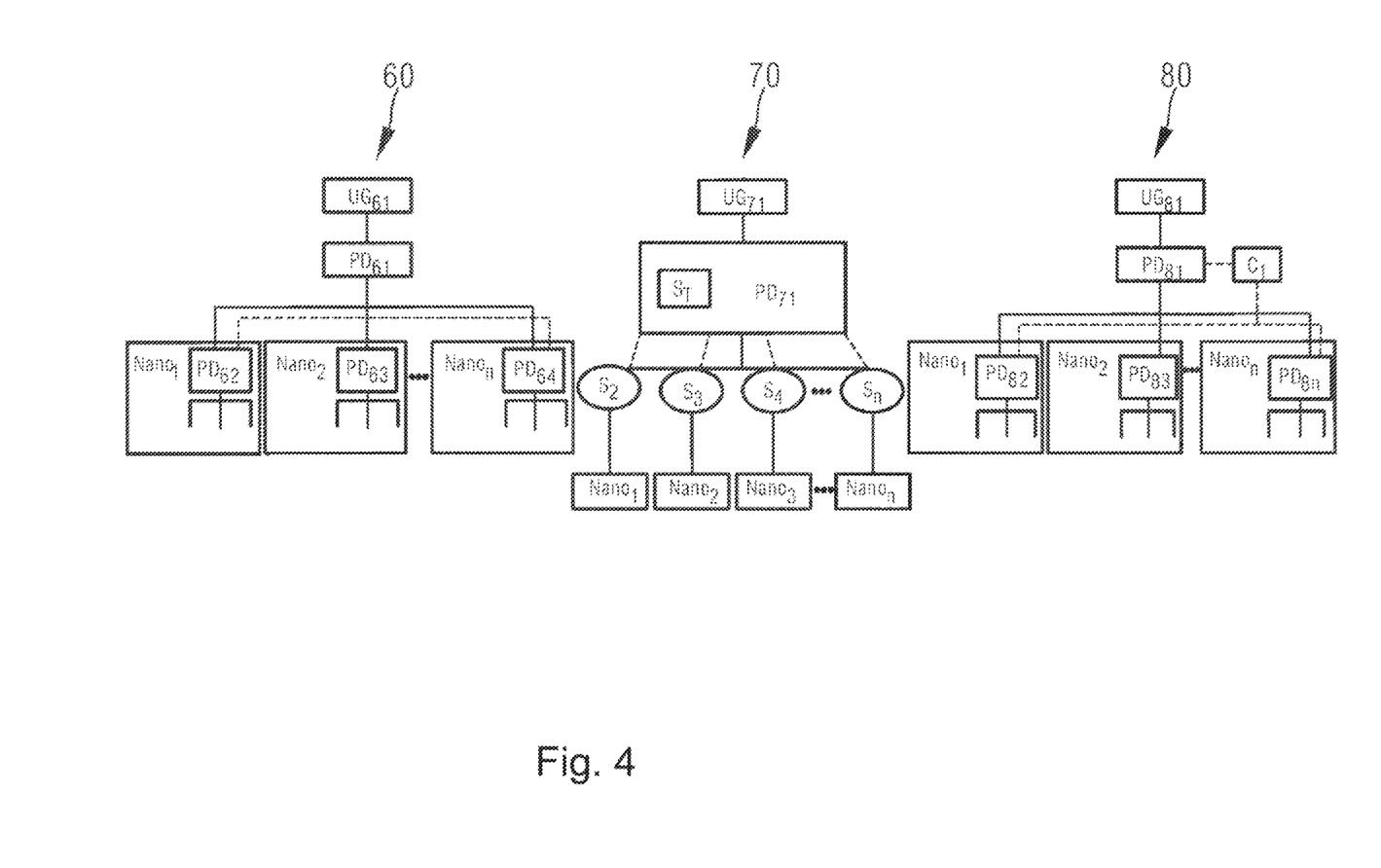
FIG. 4 is a schematic communication connection diagram of a power system having distributed power sources according to a specific embodiment of the present invention.

FIG. 4 is a schematic drawing of communication connections of a power system having distributed power sources according to a particular embodiment of the present invention. As shown in FIG. 4, a communication part of the present invention may be realized by way of a protection device between an AC power source and multiple parallel circuits connected in parallel and protection devices in each distributed grid, but may also be realized by respectively providing multiple voltage/current detection modules in each distributed grid and at the protection device between the AC power source and multiple parallel circuits connected in parallel, and may also be realized by providing an additional controller.

A second embodiment of the present invention provides a device for detecting a fault in a grid having distributed energy sources; the grid 60 comprises an AC power source $UG_{61}$ provided by at least one public grid, the AC power source $UG_{61}$ being coupled to multiple parallel circuits $Nano_1$, $Nano_2$ ... $Nano_n$ connected in parallel, each of the parallel circuits comprising multiple parallel branches, the parallel branches being respectively connected to a load and/or DC power source, wherein the device for detecting a fault in a grid having distributed energy sources comprises a first protection device $PD_{61}$, which is connected between the AC power source $UG_{61}$ and the multiple parallel circuits $Nano_1$, $Nano_2$ ... $Nano_n$ connected in parallel, wherein a first collection point is further chosen between the AC power source $UG_{61}$ and the multiple parallel circuits $Nano_1$, $Nano_2$ ... $Nano_n$ connected in parallel; the first protection device $PD_{61}$ collects a current value of the first collection point and a current direction thereof, and compares an output current and input current of the first collection point, and if the input current thereof is greater than the output current, determines that a fault has occurred in the multiple parallel circuits connected in parallel.

Furthermore, the device for detecting a fault in a grid having distributed energy sources further comprises multiple second protection devices $PD_{62}$, $PD_{63}$ ... $PD_{6n}$ connected to the branches of the multiple parallel circuits connected in parallel, wherein multiple second collection points are disposed in a region of the multiple parallel circuits connected in parallel; the second protection devices $PD_{62}$, $PD_{63}$ ... $PD_{6n}$ collect multiple current values of the multiple second collection points, and when the minimum value amongst the multiple current values of the multiple second collection points is greater than a first fault current threshold, the second protection devices $PD_{62}$, $PD_{63}$ ... $PD_{6n}$ determine that the fault is a blind spot fault.

Furthermore, when the current value of any one of the second collection points is greater than a second fault current threshold, the second protection device $PD_{62}$, $PD_{63}$ ... $PD_{6n}$ is triggered, wherein the second fault current threshold is less than the first fault current threshold.

Furthermore, as shown in FIG. 4, the first protection device $PD_{61}$ communicates with the multiple second protection devices $PD_{62}$, $PD_{63}$ ... $PD_{6n}$ respectively, and the multiple second protection devices $PD_{62}$, $PD_{63}$ ... $PD_{6n}$ communicate with each other. Communication lines are indicated by dotted lines in the drawing.

According to a variant of the above embodiment of the present invention, in a grid 70 having distributed energy sources, the device for detecting a fault in a grid having distributed energy sources further comprises multiple second voltage/current detection modules $S_2$, $S_3$, $S_4$ ... $S_n$ connected to the branches of the multiple parallel circuits connected in parallel, wherein multiple second collection points are disposed in a region of the multiple parallel circuits connected in parallel; the second protection devices $PD_{62}$, $PD_{63}$ ... $PD_{6n}$ collect multiple current values of the multiple second collection points, and when the minimum value amongst the multiple current values of the multiple second collection points is greater than a first fault current threshold, the voltage/current detection modules determine that the fault is a blind spot fault, wherein a first voltage/current detection module $S_1$ is also disposed in the first protection device.

Furthermore, when the current value of any one of the second collection points is greater than a second fault current threshold, the second voltage/current detection module $S_2$, $S_3$, $S_4$ ... $S_n$ triggers the second protection device of the parallel branch where the second collection point in question is located, wherein the second fault current threshold is less than the first fault current threshold.

Furthermore, the first voltage/current detection module $S_1$ of the first protection device communicates with the multiple second voltage/current detection modules $S_2$, $S_3$, $S_4$ ... $S_n$ respectively. Communication lines are indicated by dotted lines in the drawing.

A third embodiment of the present invention further provides a device for detecting a fault in a grid having distributed energy sources; the grid 80 comprises at least one AC power source $UG_{81}$ provided by the public grid, the AC power source $UG_{81}$ being coupled to multiple parallel circuits $Nano_1$, $Nano_2$ ... $Nano_n$ connected in parallel, each of the parallel circuits comprising multiple parallel branches, the parallel branches being respectively connected to a load and/or DC power source, wherein the device for detecting a fault in a grid having distributed energy sources comprises: a first protection device $P_{81}$, which is connected between the AC power source $UG_{81}$ and the multiple parallel circuits $Nano_1$, $Nano_2$ ... $Nano_n$ connected in parallel; a controller $C_1$ connected to the first protection device $P_{81}$, wherein a first collection point is further chosen between the AC power source $UG_{81}$ and the multiple parallel circuits $Nano_1$, $Nano_2$ ... $Nano_n$ connected in parallel; the first protection device $P_{81}$ collects a current value of the first collection point and a current direction thereof and transmits same to the controller $C_1$; the controller $C_1$ compares an output current and input current of the first collection point, and if the input current thereof is greater than the output current, determines that a fault has occurred in the multiple parallel circuits $Nano_1$, $Nano_2$ ... $Nano_n$ connected in parallel.

Furthermore, the device for detecting a fault in a grid having distributed energy sources further comprises multiple second protection devices $PD_{82}$, $PD_{83}$ ... $PD_{8n}$ connected to the branches of the multiple parallel circuits $Nano_1, Nano_2 \ldots Nano_n$ connected in parallel, wherein the controller $C_1$ is further connected to the second protection devices $PD_{82}, PD_{83} \ldots PD_{8n}$ respectively, and multiple second collection points are disposed in a region of the multiple parallel circuits connected in parallel; the second protection devices collect multiple current values of the multiple second collection points and transmit same to the controller $C_1$, and when the minimum value amongst the multiple current values of the multiple second collection points is greater than a first fault current threshold, the controller $C_1$ determines that the fault is a blind spot fault.

Furthermore, when the current value of any one of the second collection points is greater than a second fault current threshold, the controller $C_1$ triggers the second protection device $PD_{82}, PD_{83} \ldots PD_{8n}$ of the parallel branch where the second collection point in question is located, wherein the second fault current threshold is less than the first fault current threshold.

Furthermore, the controller $C_1$ communicates with the first protection device $P_{81}$ and the multiple second protection devices $PD_{82}, PD_{83} \ldots PD_{8n}$ respectively.

Embodiments of the present invention can arrange multiple collection points to troubleshoot faults according to line connections of the grid having distributed energy sources, and determine whether the fault is a blind spot fault so as to trigger a protection device, thereby avoiding misjudgment of blind spot faults.

Although the content of the present invention has been described in detail by way of the preferred embodiments above, it should be recognized that the description above should not be regarded as limiting the present invention. Various amendments and substitutions for the present invention will be obvious to those skilled in the art after reading the above content. Thus, the scope of protection of the present invention should be defined by the attached claims. Moreover, reference numbers used in the claims should not be regarded as limiting the claims concerned; the word "comprises" does not rule out other devices or steps that are not set out in the claims or specification; and words such as "first" and "second" are merely used to indicate designations, and do not indicate any specific order.

The invention claimed is:

1. A method for detecting a fault in a grid having distributed energy sources, the grid including at least one AC power source provided by a public grid, the at least one AC power source being coupled to multiple parallel circuits connected in parallel, a first protection device being coupled between the AC power source and the multiple parallel circuits, each of the multiple parallel circuits including multiple parallel branches, each of the multiple parallel branches being respectively connected to at least one of a load or a DC power source, the method comprising:

choosing a first collection point between the at least one AC power source and the multiple parallel circuits;

collecting a current value of the first collection point and a current direction of the first collection point; and determining, by a controller, that a fault has occurred in the multiple parallel circuits based on an input current of the first collection point being greater than an output current of the first collection point, the input current of the first collection point being $I_{in}=I_{PDgrid}+\Sigma I_{branchi}$, wherein, $I_{PDgrid}$ is a first current output from the at least one AC power source to the first collection point, and $\Sigma I_{branchi}$ is a sum of one or more second currents output to the first collection point from the multiple parallel circuits, the one or more second currents having a same current direction as the first current, and i being a natural number, and the method further includes determining, by the controller, that the fault is a blind spot fault after the determining that the fault has occurred, the determining that the fault is the blind spot fault being based on a first value among multiple current values being greater than a first fault current threshold, the multiple current values being collected at multiple second collection points in a region of the multiple parallel circuits, and the first fault current threshold corresponding to the first protection device, determining, by the controller, that a current value of a second collection point is greater than a second fault current threshold, the current value of the second collection point being among the multiple current values, the second collection point being among the multiple second collection points, and the second fault current threshold being less than the first fault current threshold, and triggering, by the controller, a second protection device of a first branch among the multiple parallel branches to create an open circuit in the first branch based on determining that the current value of the second collection point is greater than the second fault current threshold, the second collection point being located in the first branch, and the creation of the open circuit in the first branch causing the first protection device to trigger to resolve the blind spot fault.

2. The method of claim 1, wherein the output current of the first collection point is:

$$I_{out}=\Sigma I_{branchi}$$

wherein $\Sigma I_{branchi}$ is a third current output to the first collection point from the multiple parallel circuits, the third current having a current direction opposite to a current direction of the first current, and I being a natural number.

3. The method of claim 1, wherein the triggering creates the open circuit at a location of the second protection device.

4. The method of claim 3, wherein the first value among the multiple current values is a minimum value among the multiple current values.

5. The method of claim 1, wherein the second collection point is included in a same branch among the multiple parallel branches as the second protection device.

6. The method of claim 5, wherein the first value among the multiple current values is a minimum value among the multiple current values.

7. The method of claim 1, wherein the first value among the multiple current values is a minimum value among the multiple current values.

8. A system for detecting a fault in a grid having distributed energy sources, the grid including at least one AC power source provided by a public grid, the at least one AC power source being coupled to multiple parallel circuits connected in parallel, each of the multiple parallel circuits including multiple parallel branches, the parallel branches being respectively connected to at least one of a load or DC power source, the system comprising:

a first protection device connected between the at least one AC power source and the multiple parallel circuits; and a controller connected to the first protection device, wherein
the first protection device is configured to collect a current value of a first collection point and a current direction of the first collection point, the first collection point being between the at least one AC power source and the multiple parallel circuits, and
the controller is configured to determine that a fault has occurred in the multiple parallel circuits based on an input current of the first collection point being greater than an output current of the first collection point, the input current of the first collection point being $I_{in}=I_{PDgrid}+\Sigma I_{branchi}$, wherein,
$I_{PDgrid}$ is a first current output from the at least one AC power source to the first collection point, and $\Sigma I_{branchi}$ is a sum of one or more second currents output to the first collection point from the multiple parallel circuits, the one or more second currents having a same current direction as the first current, and i being a natural number, the system further includes multiple second protection devices connected to the multiple parallel branches, the controller being connected to each of the multiple second protection devices, multiple second collection points being in a region of the multiple parallel circuits and the multiple second protection devices being configured to collect multiple current values of the multiple second collection points, and the controller is configured to
determine that the fault is a blind spot fault after the determination that the fault has occurred, the determination that the fault is the blind spot fault being based on a first value among the multiple current values of the multiple second collection points being greater than a first fault current threshold, and the first fault current threshold corresponding to the first protection device, determine that a current value of a second collection point is greater than a second fault current threshold, the current value of the second collection point being among the multiple current values, the second collection point being among the multiple second collection points, and the second fault current threshold being less than the first fault current threshold, and trigger a second protection device of a first branch among the multiple parallel branches to create an open circuit in the first branch based on determining that the current value of the second collection point is greater than a second fault current threshold, the second collection point being located in the first branch, and the creation of the open circuit in the first branch causing the first protection device to trigger to resolve the blind spot fault.

9. The system of claim 8, wherein
the first protection device is configured to communicate with each of the multiple second protection devices; and
each respective second protection device among the multiple second protection devices is configured to communicate with at least one other second protection device among the multiple second protection devices.

10. The system of claim 8, further comprising:
a first voltage/current detection module in the first protection device; and
multiple second voltage/current detection modules connected to the multiple parallel branches.

11. The system of claim 10, wherein the first voltage/current detection module is configured to communicate with each of the multiple second voltage/current detection modules.

12. The system of claim 8, wherein the controller is configured to communicate with the first protection device and each of the multiple second protection devices.

13. The system of claim 8, wherein the output current of the first collection point is:

$$I_{out}=\Sigma I_{branchi},$$

wherein $\Sigma I_{branchi}$ is a third current output to the first collection point from the multiple parallel circuits, the third current having a current direction opposite to a current direction of the first current, and i being a natural number.

14. The system of claim 13, wherein the triggered second protection device creates the open circuit at a location of the second protection device.

15. The system of claim 8, wherein the triggered second protection device creates the open circuit at a location of the second protection device.

16. The system of claim 15, wherein the output current of the first collection point is:

$$I_{out}=\Sigma I_{branchi},$$

wherein $\Sigma I_{branchi}$ is a third current output to the first collection point from the multiple parallel circuits, the third current having a current direction opposite to a current direction of the first current, and i being a natural number.

17. The system of claim 15, wherein the second collection point is included in a same branch among the multiple parallel branches as the second protection device.

18. The system of claim 8, wherein the second collection point is included in a same branch among the multiple parallel branches as the second protection device.

19. The system of claim 18, wherein the first value among the multiple current values is a minimum value among the multiple current values.

20. The system of claim 8, wherein the first value among the multiple current values is a minimum value among the multiple current values.

* * * * *